US012727058B2

(12) United States Patent
Hofleitner et al.

(10) Patent No.: US 12,727,058 B2

(45) Date of Patent: Sep. 1, 2026

(54) INTEGRATED AND COMPARTMENTALIZED SYSTEM AND METHOD FOR FOOD STORAGE AND PROCESSING

(71) Applicant: Pahmet LLC, Washington, DC (US)

(72) Inventors: Peter Hofleitner, Annapolis, MD (US); Martin Tross, Annapolis, MD (US)

(73) Assignee: Pahmet LLC, Washington, DC (US)

( * ) Notice: Subject to any disclaimer, the term of this patent is extended or adjusted under 35 U.S.C. 154(b) by 1397 days.

(21) Appl. No.: 17/340,792

(22) Filed: Jun. 7, 2021

(65) Prior Publication Data

US 2021/0345458 A1 Nov. 4, 2021

Related U.S. Application Data

(63) Continuation of application No. 15/777,663, filed as application No. PCT/US2016/063201 on Nov. 21, (Continued)

(51) Int. Cl.

*H05B 6/06* (2006.01)

*A47J 39/00* (2006.01)

(Continued)

(52) U.S. Cl.

CPC .............. *H05B 6/06* (2013.01); *A47J 39/006* (2013.01); *F24C 15/18* (2013.01); *F25D 13/04* (2013.01);

(Continued)

(58) Field of Classification Search

CPC ......... B60P 3/0257; G07F 9/105; H05B 6/06; H05B 6/10; H05B 6/1209; H05B 6/1245; A47J 39/006; F24C 15/18; F25D 13/04

See application file for complete search history.

(56) References Cited

U.S. PATENT DOCUMENTS 3,777,094 A * 12/1973 Peters, Jr. ............... A47J 36/04 220/592.2

4,030,632 A * 6/1977 Harashima ............. G07F 9/105 222/639

(Continued)

FOREIGN PATENT DOCUMENTS

CN 2204037 7/1995

CN 2249019 3/1997

(Continued)

OTHER PUBLICATIONS

Extended European Search Report issued for U.S. Appl. No. 16/867,358 dated Oct. 19, 2019.

*Primary Examiner* — Helena Kosanovic

(74) *Attorney, Agent, or Firm* — Rouget F. Henschel; Potomac Law Group, PLLC

(57) ABSTRACT

A system is provided that offers climate control, and optionally other processing, in separated compartments that hold items in removable and/or lockable containers that may be individually climate-controlled. In addition to these basic functions, the system can integrate functions for notifying users of important events. Examples include, but are not limited to, sensor readings that indicate spoiled food, temperature changes outside a desired range, containers not opened or removed within a predetermined time period, etc. Different processing options for items stored in the compartments may be integrated into the system. Examples of advanced processing include, but are not limited to, heating (thawing, cooking), pressurizing or depressurizing containers, physical movement of items (vibrating, turning content in the container), etc.

4 Claims, 15 Drawing Sheets

Related U.S. Application Data

2016, now abandoned, which is a continuation-in-part of application No. PCT/US2016/043215, filed on Jul. 20, 2016.

(60) Provisional application No. 62/257,337, filed on Nov. 19, 2015, provisional application No. 62/194,215, filed on Jul. 18, 2015.

(51) Int. Cl.

| | |
|---|---|
| ***F24C 15/18*** | (2006.01) |
| ***F25D 13/04*** | (2006.01) |
| ***G07F 9/10*** | (2006.01) |
| ***G07F 11/62*** | (2006.01) |
| ***H05B 6/10*** | (2006.01) |
| ***H05B 6/12*** | (2006.01) |

(52) U.S. Cl.

CPC .............. *G07F 9/105* (2013.01); *G07F 11/62* (2013.01); *H05B 6/10* (2013.01); *H05B 6/1209* (2013.01); *H05B 6/1245* (2013.01)

(56) References Cited

U.S. PATENT DOCUMENTS 4,671,425 A * 6/1987 Knoll ...................... G07F 11/70 99/357
4,776,386 A 10/1988 Meier
5,280,152 A 1/1994 Lee
5,466,915 A 11/1995 Meier et al.
5,567,458 A * 10/1996 Wu ...................... A47J 27/004 426/523
6,315,039 B1 11/2001 Westbrooks, Jr. et al.
6,359,268 B1 3/2002 Walter
7,015,436 B2 * 3/2006 Fila ...................... A21C 15/02 219/601
8,602,248 B2 * 12/2013 Mathieu ................ A47J 27/002 220/573.1
10,743,708 B2 8/2020 Alexander et al.
2002/0121509 A1 9/2002 Shei et al.
2006/0278629 A1 12/2006 Gagas et al.
2009/0095736 A1 * 4/2009 Graber ................... H05B 6/062 219/625
2010/0000980 A1 * 1/2010 Popescu .............. A47J 36/2466 219/201
2011/0000904 A1 * 1/2011 Sakakibara ........... H05B 6/062 219/624
2012/0000744 A1 * 1/2012 Roekens ............. G07F 17/0071 62/250
2012/0055191 A1 3/2012 Lee et al.
2013/0175253 A1 7/2013 Shei et al.
2013/0177683 A1 7/2013 Shei et al.
2013/0319995 A1 12/2013 Bringe et al.
2013/0330442 A1 * 12/2013 Holman ................ G07F 7/0893 99/485
2014/0224826 A1 8/2014 Otzen
2015/0083711 A1 * 3/2015 Moon ..................... A47J 36/02 29/602.1
2015/0319812 A1 * 11/2015 Fryshman ................ H05B 6/06 219/622
2016/0049036 A1 2/2016 Nelson
2016/0253861 A1 9/2016 Seo
2018/0061170 A1 * 3/2018 Roekens ............... G07F 7/0609
2018/0313598 A1 11/2018 Jeong et al.

FOREIGN PATENT DOCUMENTS

CN 1979065 A 6/2007
CN 101228741 A 7/2008
CN 102116497 A 7/2011
CN 103004286 A 3/2013

* cited by examiner 140
20

400
420
410
430

INTEGRATED AND COMPARTMENTALIZED SYSTEM AND METHOD FOR FOOD STORAGE AND PROCESSING

This application is a continuation of U.S. application Ser. No. 15/777,663, filed May 19, 2018, which is a continuation-in-part of International Patent Application No. PCT/US2016/043215, filed on Jul. 20, 2016, which claims priority to U.S. Provisional Application Ser. No. 62/194,215, filed Jul. 20, 2015, and to U.S. Provisional Application Ser. No. 62/257,337, filed on Nov. 19, 2015. Their entire disclosures are incorporated herein by reference.

BACKGROUND OF THE INVENTION

1. Field of the Invention

The present invention relates to the food storage and preparation and, more specifically, to a compact, integrated, compartmentalized system for food storage and processing.

2. Background of the Related Art

Currently, many institutions, such as universities, do not allow cooking appliances in dormitories due to the fire hazard that conventional cooking appliances pose.

In addition, many offices, dormitories, residences, warehouses, etc., provide off-the-shelf refrigerators for employees/residents to use. Many, if not all, face similar problems such as food theft, spoiled food product, lack of space, cleanliness, not knowing who owns the food in the refrigerator, people afraid to clean out the refrigerator due to not knowing if someone's food is still good or not, smelly refrigerators, etc. This becomes a sanitation issue as well. Other problems encountered are refrigerator doors left open or ajar, people adjusting the refrigerator temperature, thereby possibly effecting food items owned by others.

Food storage and preparation in recreational vehicles and boats also pose a challenge due to the limited amount of space.

Thus, there is a need for a system that addresses at least the above described problems with conventional food storage and preparation units.

SUMMARY OF THE INVENTION

An object of the invention is to solve at least the above problems and/or disadvantages and to provide at least the advantages described hereinafter.

Therefore, an object of the present invention is to provide a system with individual compartments for storing and/or processing perishable and non-perishable items, in which at least one parameter in each compartment can be individually controlled.

Another object of the present invention is to provide a system with individual climate-controlled compartments for storing and/or processing perishable and non-perishable items that also include sensors for detecting one or more parameters of items located in the compartments.

Another object of the present invention is to provide a system with individual climate-controlled compartments for refrigerating items in the compartment.

Another object of the present invention is to provide a system with individual climate-controlled compartments for refrigerating, freezing, thawing, cooking, pressurizing and/or physically moving items in each compartment.

Another object of the present invention is to provide a compact system with individual climate-controlled compartments for refrigerating, freezing, thawing and/or pressurizing of items in each compartment, and that also includes a cooktop for food preparation.

Another object of the present invention is to provide a compact system with individual climate-controlled compartments for refrigerating, freezing, thawing and/or pressurizing of items in each compartment, and that also includes an induction cooktop for food preparation.

Another object of the present invention is to provide a system with individual climate-controlled compartments for storing and/or processing perishable and non-perishable items, in which access to the individual compartments can be controlled with a smartphone application.

Another object of the present invention is to provide a system with individual climate-controlled compartments for storing and/or processing perishable and non-perishable items, in which access to the individual compartments can be controlled with a proximity sensor.

Another object of the present invention is to provide a system with individual climate-controlled compartments for storming and/or processing perishable and non-perishable items, that also includes an induction cooktop for food preparation and that also includes at least on fold-down workstation surface.

To achieve at least the above objects, in whole or in part, there is provided a system for storing and/or processing perishable or non-perishable items, comprising a housing, at least two compartments contained within the housing, wherein each compartment is adapted to contain perishable or non-perishable items, a climate control system associated with each compartment, an induction heating element positioned on a top portion of the housing, and a processor contained within the housing in communication with the climate control system and the induction heating element, wherein the processor is adapted to individually control the climate control system associated with each compartment and to control the induction heating element.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
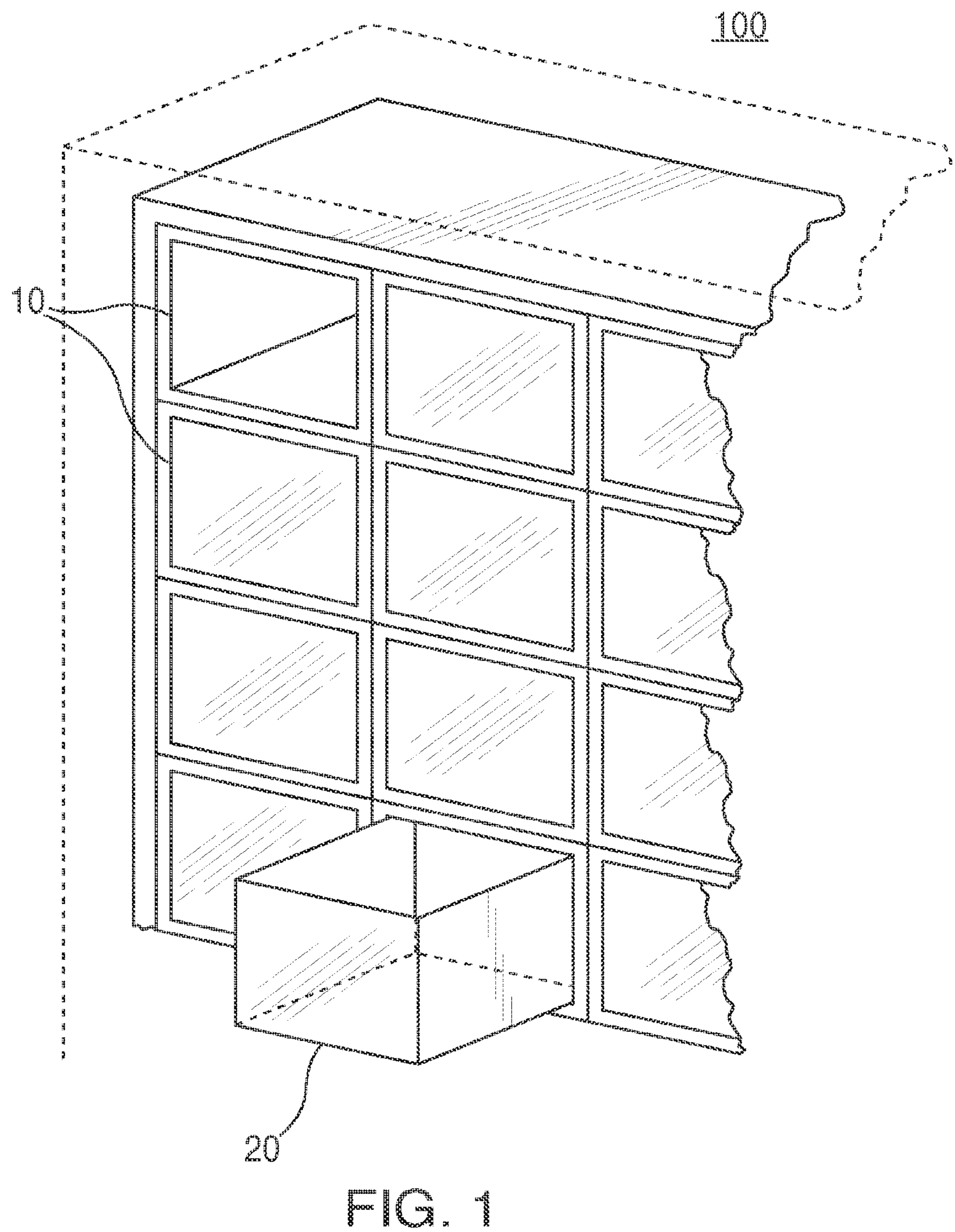
FIG. 1 is a schematic diagram illustrating the compartments and removable containers of a unit, in accordance with one embodiment of the present invention.

The present invention addresses at least the above-described issues with a system that offers climate control, and optionally other processing, in separated compartments that hold items in removable and/or lockable containers that may be individually climate-controlled. In addition to these basic functions, the system can integrate functions for notifying users of important events. Examples include, but are not limited to, sensor readings that indicate spoiled food, temperature changes outside a desired range, containers not opened or removed within a predetermined time period, etc. In one preferred embodiment, different processing options for items stored in the compartments are integrated into the system. Examples of advanced processing include, but are not limited to, heating (thawing, cooking) pressurizing or depressurizing containers, physical movement of items (vibrating, turning content in the container), etc.

The present invention is preferably an integrated unit that can store and process perishable and non-perishable items in a variety of ways. The unit preferably integrates functions in addition to refrigeration, such as a freezer, an ice unit and/or an oven, and has multiple separate compartments that can be individually controlled for temperature, humidity, pressure, and/or other conditions. The unit may freeze, refrigerate, thaw, warm, heat, cook, pressurize, depressurize, and/or otherwise process items in each compartment separately. The unit could also have hot and cold water and other beverage dispensing compartment. The unit may also incorporate various forms of robotics for further automation of the system. Items are preferably inserted and stored in the unit by use of removable containers, which may be locked into the compartments to prevent unauthorized access.

The present invention is not limited to processing of food items in offices or residences. Other applications for the present invention include, but are not limited to: (1) use in laboratory environments, where probes can be exposed to a variety of environmental conditions; (2) storage solutions and/or vending units for delicate items that require climate control; and (3) commercial use in restaurants, school cafeterias and others.

Potential benefits of the present invention include, but are not limited to:

- Eliminate food theft because food is secured in boxes that only the user has access to;
- Eliminate uncertainty as to whether food items are bad, expired or forgotten through the use of smart technology systems and sensors;
- Eliminate moldy, smelly refrigerators;
- In an embodiment of the present invention that integrates multiple processing functions, space can be saved by eliminating the need for separate units to perform the respective functions. For example, one embodiment of the present invention could incorporate the functions of a microwave, toaster oven, ice unit and dishwasher;
- Energy savings through compartmentalizing space and cooling and/or heating only occupied spaces;
- In one embodiment of the present invention, rapid and energy efficient cooling and heating through vacuum cooling and induction heating;
- In one embodiment of the present invention, the ability to both heat and cool each individual compartment;
- User interactive—individual users can set times, temperatures, alarms, etc. for their respective compartment; and
- Employers can track and evaluate the use of the unit via data reporting.

Possible applications for the present invention include, but are not limited to:

- A refrigerator with lockable compartments for use by individuals in offices, dormitories, or similar settings;
- A refrigerator/freezer with lockable compartments and with food preparation functionality (e.g., thawing, warming, heating, cooking), for use by individuals in offices, dormitories or similar settings;
- A storage unit for delicate beverages (e.g., wines, cognacs, etc.) that require climate controlled storage. Temperature and humidity in each compartment can be individually. Each compartment may optionally have a mechanism that allows slow rotation of a bottle in the compartment;
- A storage unit for cigars which allows for the storage of various types of cigars under different conditions (in separate compartments), and also allows access control (e.g., for shared humidors);
- A multifunctional unit that may integrate compartments with different features, thereby allowing for the storage of vines, cigars, and/or other items within one unit;
- A unit for a laboratory setting that allows probes to be exposed to different environmental conditions, such as, for example, physical movement (e.g., shaking, vibrating, stirring etc.). The environmental conditions in each compartment can be individually programmed and monitored through use of sensors, actuators, and controllers integrated into each compartment or container;

A vending unit for prepared food items. Such units can keep food items refrigerated and quickly warm or heat items before dispensing them;

Transportation—commercial/business aircraft and cruise ships/yachts could use the present invention for meals and beverages;

Restaurants can use the present invention for individual special food entrees and storage of those entrees, beverages, cigars and vending units;

Restaurants, bars & clubs could utilize the refrigeration feature of the present invention for specific bottle service at exact temperatures and/or full bottle service ownership, whereby a customer that buys an entire bottle and/or mixers for the night could store the bottle at a chilled temperature in a locked cabinet that only that purchaser can open to retrieve the bottle and/or mixers;

Restaurants/bars and/or clubs could also incorporate an embodiment of the present invention on a larger scale that could robotize the commercial restaurant and bar industry by allowing the customer to order their food through an application on their smartphone prior to arrival. The system would find and cook their meal to order and could even deliver said food and beverage via robotics to the table without ever needing a waiter, thereby eliminating a substantial cost burden to the restaurant owner. It would automate the order, preparation, delivery and cleanup of plates and food items. Behind the scenes, the restaurant cooks and/or robots could prepare the food in the specialized trays and place them into the oven;

Schools, ski lodges, arenas and cafeterias could incorporate the present invention both as a unit used behind the kitchen line, and a unit that is used in the main area of the restaurant for customers to use with their own food or purchased products. One example is a school cafeteria whereby students could place their food into a locked compartment and set a precise time for cooking/chilling the food items (such as their lunch hour) so that it is ready when the school bell rings. Another example behind the kitchen lines is utilizing the invention as a multi-stacked grouping of robotic line cooks able to handle a high volume of students for lunch service. All of the meals could be timed to be cooked to perfection at a predetermined time. Once the unit is unloaded, another load could be placed into the unit for the next group of people;

Pharmacies, hospitals, doctors, veterinarian offices, etc. can use the present invention for medicine and/or biological items, such as blood, organs etc.;

Coffee houses can keep bulk coffee beans vacuum packed and under correct temperatures for better preservation of the beans; and The present invention can be used to create and store/maintain dry ice.

FIG. 1 is a schematic diagram illustrating the compartments 10 and removable containers 20 of a unit 100, in accordance with one embodiment of the present invention. The unit 100 can be as simple as a standard refrigeration unit that has been compartmentalized for targeted use in offices, dormitories, roommate scenarios, home use, etc. Such a unit 100 could either be created by converting existing refrigerator models to allow installation of separate compartments or through a new refrigerator design.

Figure 2:
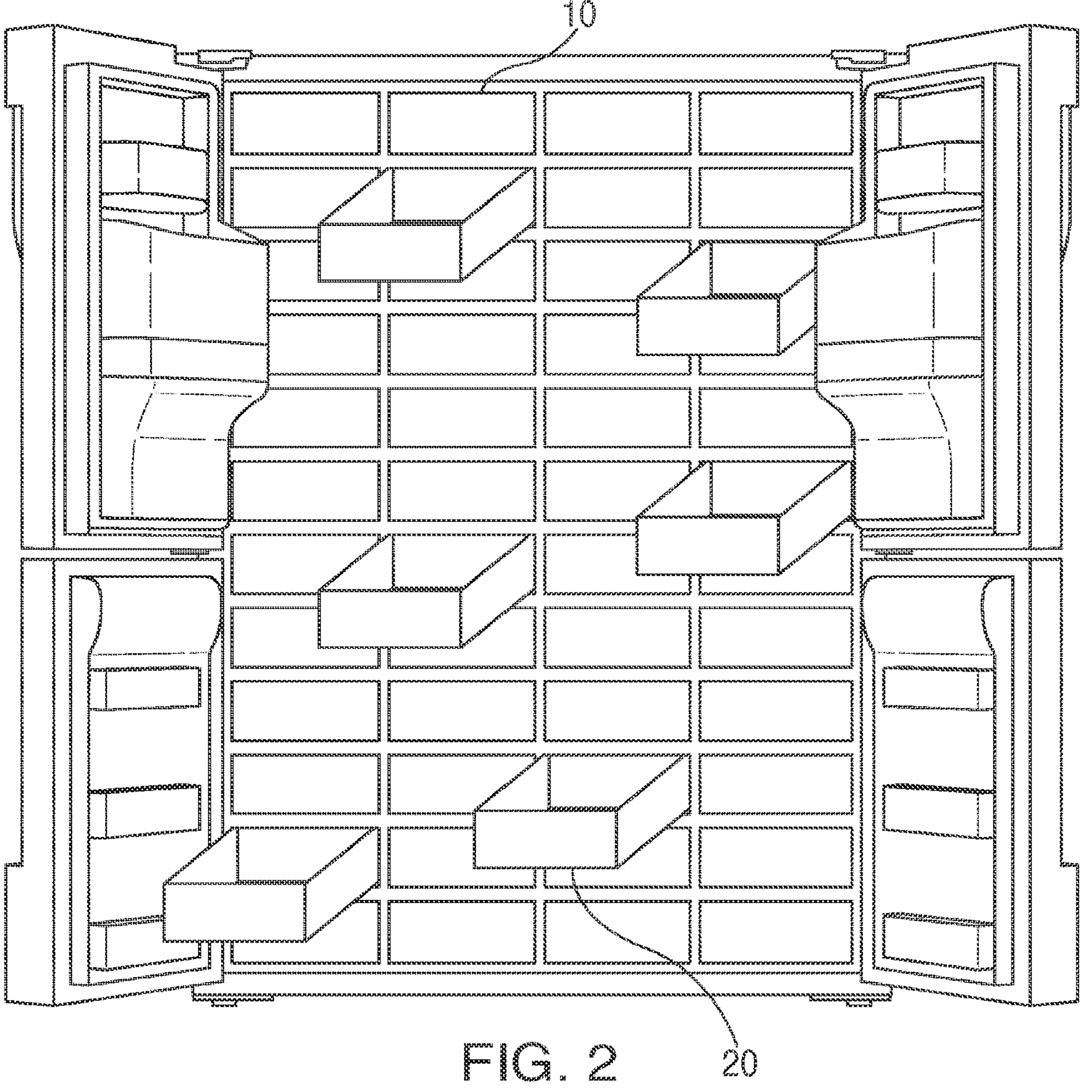
FIG. 2 is a schematic diagram illustrating the conversion of an existing refrigerator model to allow for separate compartments, in accordance with one embodiment of the present invention.

FIG. 2 is a schematic diagram illustrating the conversion of an existing refrigerator model to allow for separate compartments 10, in accordance with one embodiment of the present invention.

Figure 3:
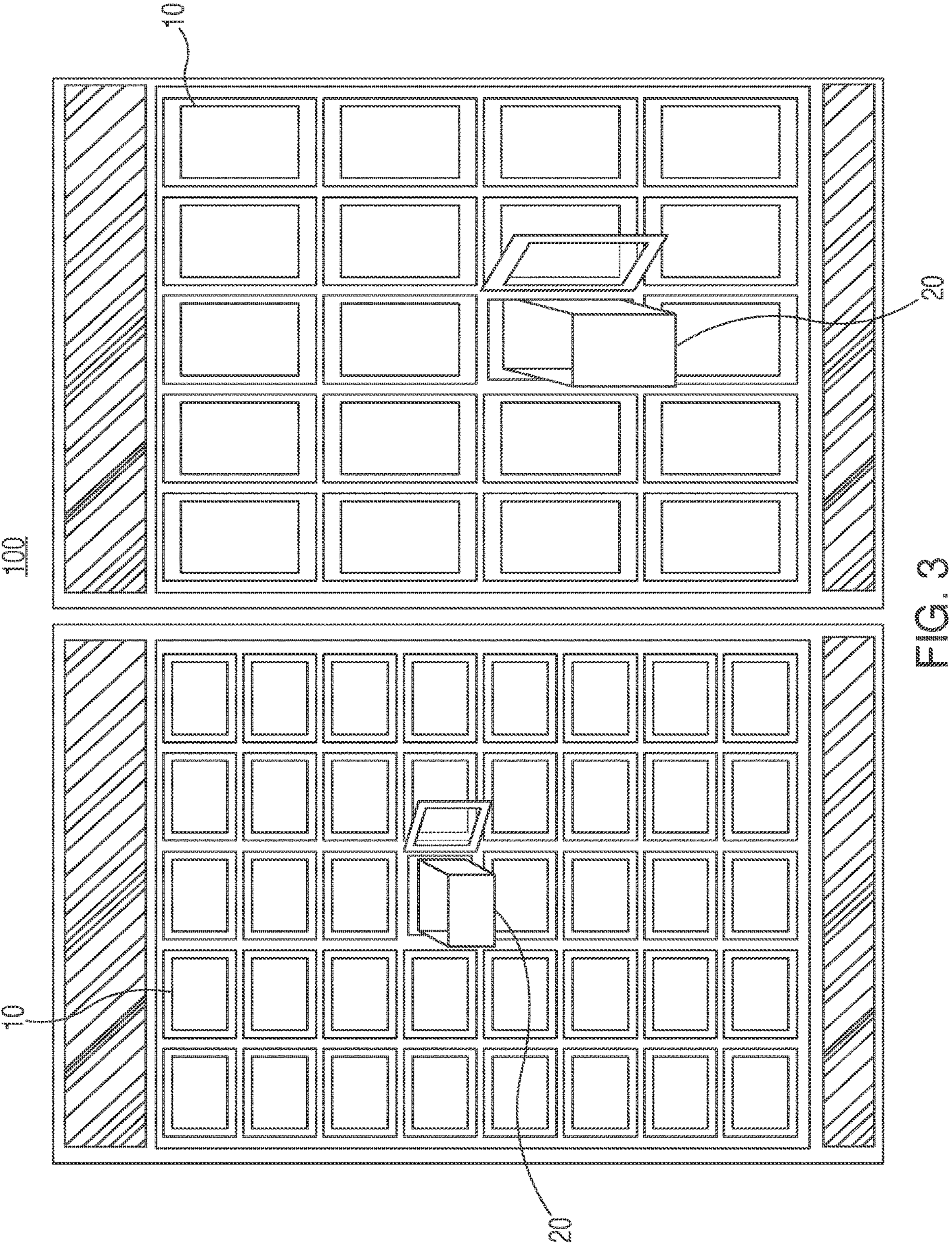
FIG. 3 is a schematic diagram illustrating a refrigerator design with compartments of different sizes, in accordance with one embodiment of the present invention.

FIG. 3 is a schematic diagram illustrating a refrigerator design with compartments 10 of different sizes, in accordance with one embodiment of the present invention. The installation of a frame in conventional refrigerators may impede the flow of cold air. As a result, the temperature may differ between compartments 10. One way to address this issue is to design the frame such that it incorporates ventilation shafts, ventilation openings, and air guards as required to direct the flow of cold air to each compartment.

Figure 4:
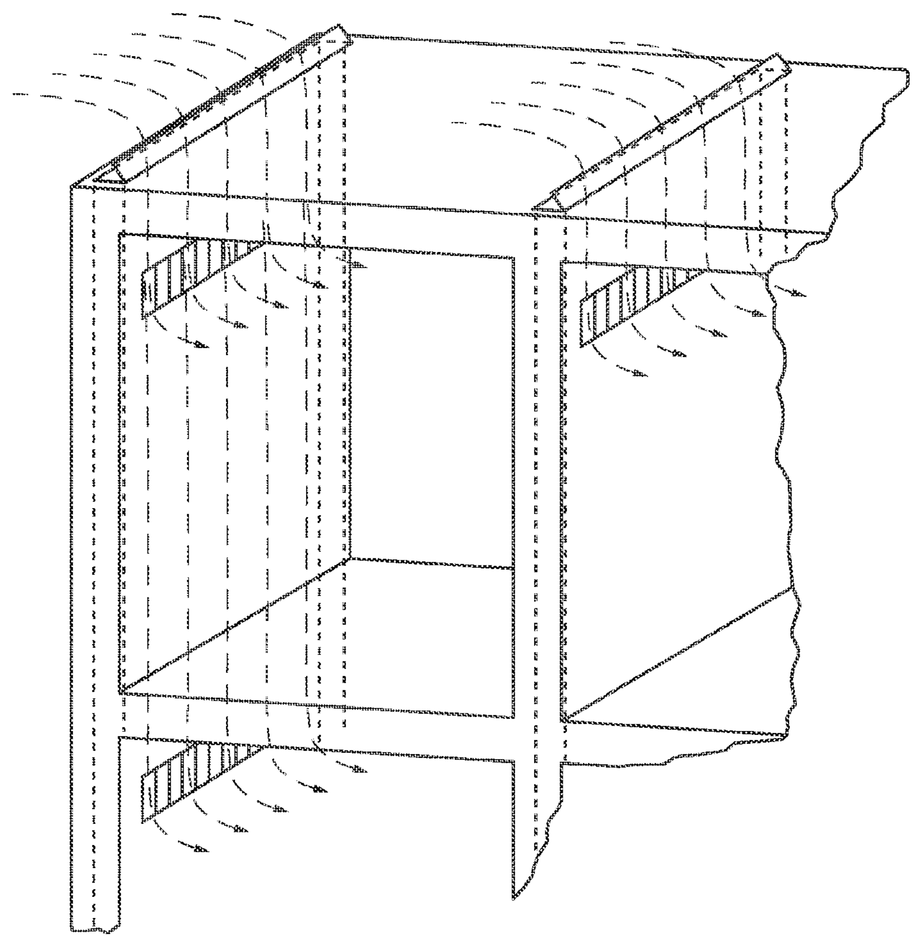
FIG. 4 is a schematic diagram illustrating one possible implementation of a frame in which cold air flowing above the frame is directed by air guards down the air shafts of the frame into individual compartments, in accordance with one embodiment of the present invention.

FIG. 4 is a schematic diagram illustrating one possible implementation of such a frame where cold air flowing above the frame is directed by air guards down the air shafts of the frame into individual compartments, in accordance with one embodiment of the present invention.

One advantage of the present invention is that it can be implemented using conventional refrigerator designs. However, a disadvantage of implementing the present invention using conventional refrigerator designs is that it does not allow for individual climate control and full separation of compartments. As a result, rotting food in one compartment may affect items in other compartments. Another embodiment of the present invention addresses these shortcomings.

Additional embodiments of the present invention preferably comprise one or more of the following:

a unit housing that aggregates, electrical components, and electronic components;

aggregates for temperature control (e.g. compressors);

optional aggregates for pressurizing/depressurizing compartments (e.g. vacuum pump);

pipes for climate control of individual compartments (e.g., cooling circuits, air pipes, etc.);

a frame within the temperature controlled section of the unit that divides the available space into multiple compartments and insulates compartments from each other;

sensors, actuators, fittings, and interfaces that connect each compartment to the main unit aggregates, electrical system, and electronic system;

removable containers that that can be inserted into the compartments; and locks that lock a container into a compartment, allowing only authorized users to remove the compartment—the locks are suitably key locks, magnetic locks, electromagnetic locks or any other type of lock.

In one preferred embodiment, each compartment can be individually controlled for environmental conditions. Examples of environmental conditions include, but are not limited to, temperature, pressure, humidity, and lighting. To achieve that level of control, each compartment preferably connects with the unit's aggregates (e.g. cooling system, vacuum pump, etc.), the unit's electrical systems, and the unit's central processor. Compartments preferably do not share piping, i.e., each compartment preferably has its own pipes to the aggregates. This eliminates cross-contamination between apartments (e.g., rotten food).

Connectors for piping, electric, and electronic components are preferably positioned in the back wall (backplane) of each compartment. Compartments are preferably designed to accept containers with matching fittings at the (container) backplane. Seals provide proper insulation and air-tight connections for piping when a container is inserted into a compartment.

Figure 5:
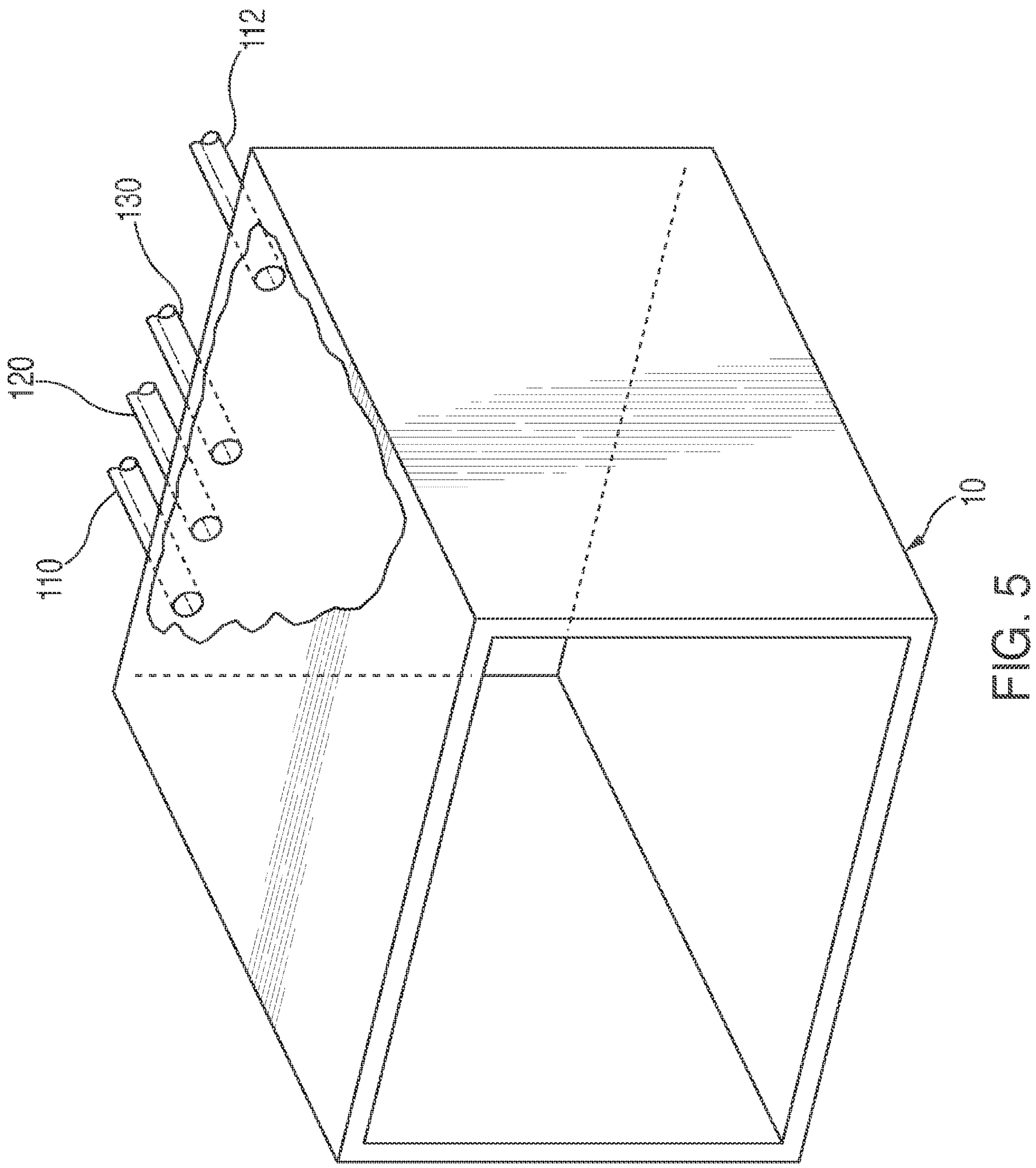
FIG. 5 is a schematic diagram illustrating an example of a compartment with fittings for cold air, a pressurized/vacuum line, and a humidifier/de-humidifier line, in accordance with one embodiment of the present invention.

FIG. 5 is a schematic diagram illustrating an example of a compartment 10 with fittings for cold air 110 and 112, pressurized/vacuum line 120, and humidifier/de-humidifier line 130, in accordance with one embodiment of the present invention.

Figure 6:
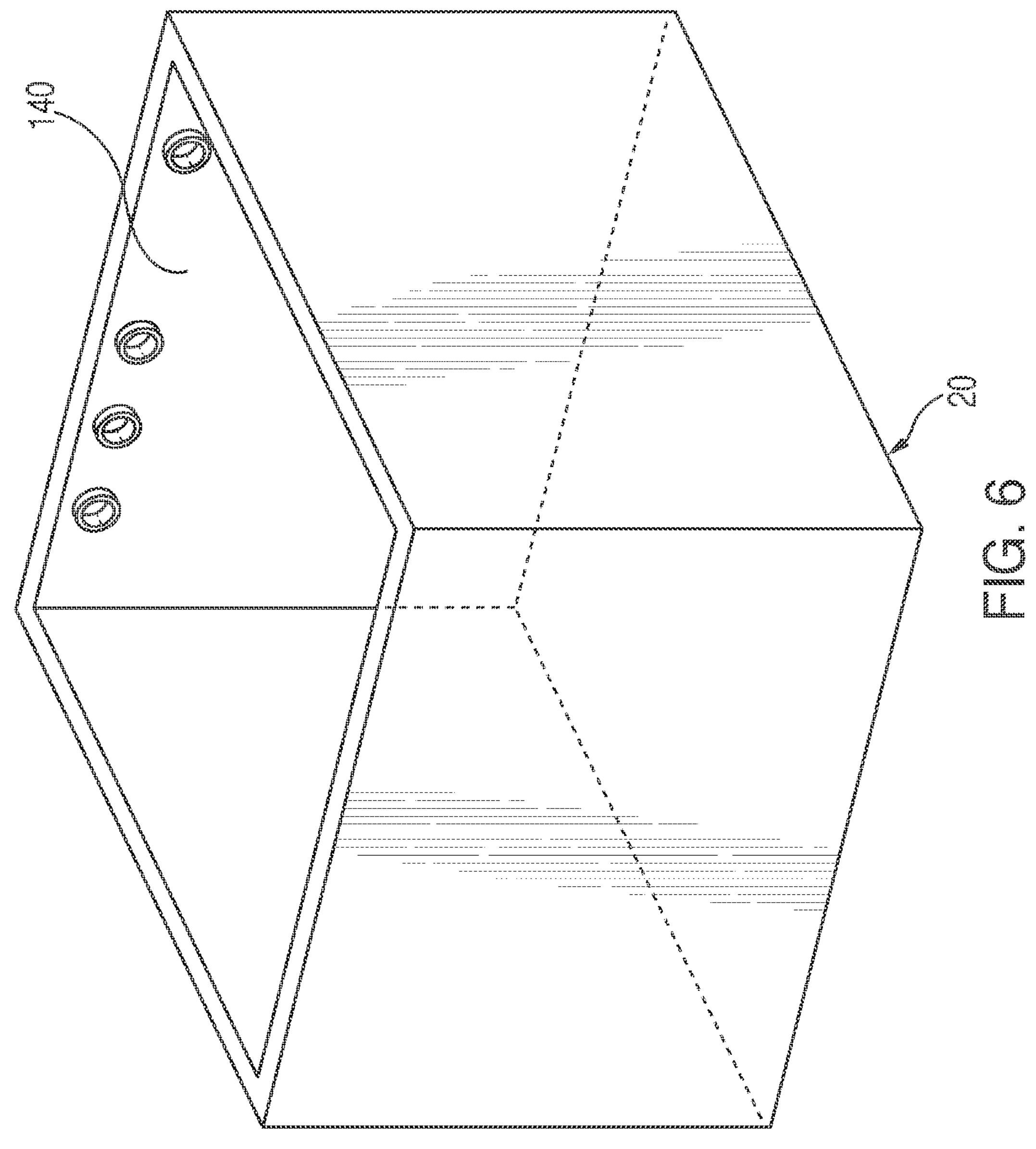
FIG. 6 is a schematic diagram illustrating a container for compartments with matching connectors, in accordance with one embodiment of the present invention.

FIG. 6 is a schematic diagram illustrating a container 20 for the compartments 10 with matching connectors 140, in accordance with one embodiment of the present invention.

This configuration allows for different types of refrigeration. Conventional cooling lines enable the flow of cold air through the compartments. The vacuum line 120 allows for rapid cooling using vacuum cooling. A variation of this embodiment may implement other cooling methods, such as those described below.

The humidifier/de-humidifier line 130 is preferably used in conjunction with cooling and vacuum to control the humidity level in the compartment. Thawing, heating, and cooking within a compartment 10 may be accomplished through induction heating or other heating methods, such as those described below.

Figure 7:
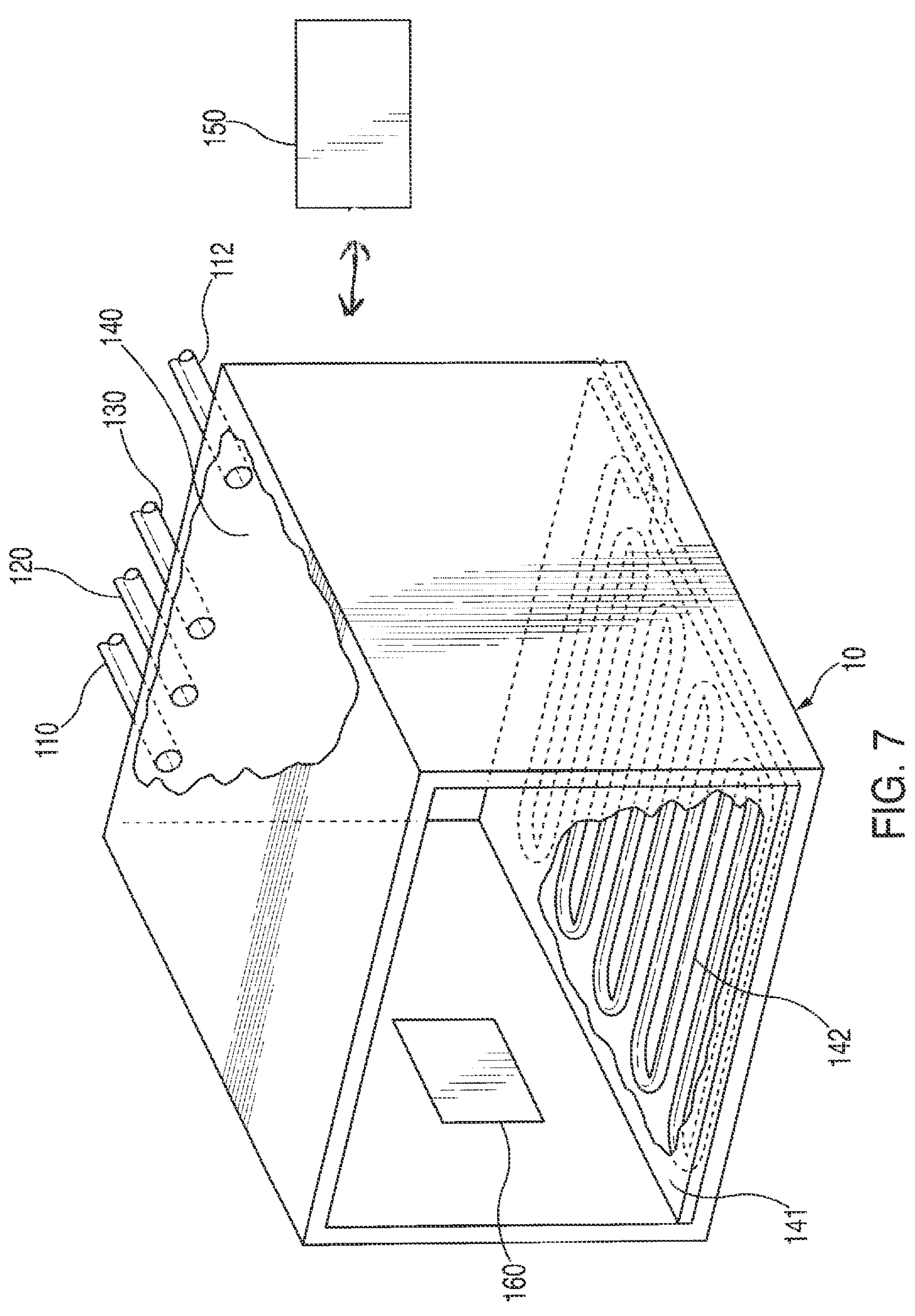
FIG. 7 is a schematic diagram of a compartment made of a glass or ceramic plate (or other suitable material) with metal wires underneath that can generate an alternating magnetic field, in accordance with one embodiment of the present invention.

For induction heating, the bottom of each compartment 10 is preferably made of a glass or ceramic plate 141 (or other suitable material) with metal wires 142 underneath that can generate an alternating magnetic field, as shown in FIG. 7. The wires are connected to the unit's electrical system through the backplane 140 and the flow of electricity is preferably controlled by the unit's central processor 150 or by a local processor 160 within the compartment (e.g., for direct loop-back with sensors to avoid overheating in case central processor crashes).

The central processor 150 or local processor 160 is preferably a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. However, the central processor 150 or local processor 160 may also be implemented with a small embedded computer system with integrated sensors, such as a smartphone running the iOS or Android operating system. The central processor 150 or local processor 160 may also be implemented with a modular electronic platform, such as the Raspberry Pi platform, or a proprietary embedded system with integrated sensors and actuators.

Induction heating allows for both cooling and heating of items within a single container 20 (e.g., food items stored in stainless steel lunch boxes within a container 20 could be heated through induction heating, whereas items in plastic or glass boxes (or bottles) within that same container are not heated and remain cold).

Containers 20 can be subdivided into cold and hot storage areas to ensure proper separation of cold and hot items (e.g., to keep plastic bottles away from the hot surfaces of the stainless steel boxes). This can be achieved through removable inserts that divide the available space in a container 20.

The inside of containers 20 may be made of silicon-based materials to withstand extreme temperatures (e.g., during heating). The advantages of silicon-based materials in food storage and food preparation have been well documented. Other applications (e.g., laboratory settings) may require different materials.

Compartments 10 are preferably insulated from each other sufficiently to allow cooking of food under pressure in one compartment 10, while refrigerating items under low pressure in an adjoining compartment 10. To achieve the proper level of insulation, the frame's thickness and material composition is preferably chosen according to the specific requirements (min/max temperature, min/max pressure, etc.).

Sensors within each compartment 10 or container 20 are preferably used to measure the environmental conditions of the compartment and the status of the content. Sensors may include, but are not limited to, ambient air temperature sensors, light sensors, pressure sensors, laser temperature sensors (e.g., for measuring temperature of content), pH sensors for measuring the pH level of content, and/or gas-detecting sensors that can identify rotting food. Any currently available or future sensor technology may be integrated.

The unit's central processor 150 preferably controls the environmental conditions of each compartment 10 based on sensor data it receives from each compartment 10 and user defined configuration parameters (e.g., set values such as desired temperature, pressure, humidity, etc). These set values may also be derived from programs or algorithms and may change over time. For example, food can be kept refrigerated until noon and then warmed or cooked. Special food items (e.g., prepared food for purchase) may come with programs and/or algorithms for storage and preparation. Such programs and/or algorithms may automatically be loaded into the central processor 150 by means of RFID tags or other technologies and methods as soon as a food container is inserted into the compartment.

Compartments 10 preferably have a locking mechanism that prevents unauthorized users from accessing containers 20. Under certain circumstances the central processor 150 may unlock a specific compartment 10 automatically, giving all users physical access to the container in that compartment 10. This may happen, for example, when sensors detect rotting food in a compartment 10 or when the maximum storage time for a compartment 10 has expired.

The central processor 150 preferably controls access to compartments 10 by requiring identification and authentication of users. Suitable methods for identification and authentication include, but are not limited to, badges, biometrics (e.g. fingerprint), number combination (e.g., pin), passwords, RFID tags (e.g., RFID bracelets) or any other existing or future devices/methods. Preferably, only authorized users (compartment owners or system administrators) can program, electronically monitor, and/or physically access compartments 10.

Authorized users preferably have access to one or more of the following functions:

downloading and execution of programs and algorithms that control the compartment's environmental conditions, including physical movement of its content (e.g., turn, shake, vibrate, etc);

locking/unlocking a compartment;

configuration of access rights (who else has access to the compartment);

configuration of alerts; and access to real-time alerts and alert logs.

Users preferably interact with the unit's central processor 150 by any means that currently exists or may exist in the future. Examples include, but are not limited to, keyboard & monitor, touch-screen, card readers, keypads, or other devices mounted on the unit or connected to the unit. Connected devices may include, but are not limited to, enterprise components (HW, SW) or personal devices like tablets, smartwatches and eyewear, such as Google Glass® or smart phones.

The central processor 150 can preferably send real-tune alerts to users through these interfaces. A user may, for instance, receive an SMS, e-mail, and/or social media notification when the temperature or humidity in their compartment 10 is outside a set target range. Some alerts may be sent to all users of the unit, not just the compartment owner. Such events may include, but are not limited to, notifications about bad or expired food items in a compartment 10 or alerts related to the whole unit, such as power outages or aggregate failures. A more detailed list of alerts that may be implemented is provided below.

The unit's central processor 150 may be connected to enterprise systems to allow integration into enterprise databases and applications via enterprise services buses or other technologies.

Special Purpose Compartments

Special compartments 10 are optional compartments that a unit 100 may or may not have depending on the unit's configuration. Special compartments 10 may offer additional functionality such as, for example:

cleaning and sanitizing containers;

special food preparation;

beverage dispensing;

ice dispensing; and other purposes.

Any of these special purpose compartments 10 could be combined with an optional vending or payment apparatus to allow for payment via various forms including cash, credit card, online payment processors (e.g., through mobile devices), or any other form of payment.

Cleaning Compartment

This is a special purpose compartment 10 for cleaning and sanitizing containers. When a container 20 is inserted, the compartment is preferably locked and a treatment program automatically starts. When the program is finished the compartment 10 is unlocked.

For example, if food in a container 20 goes bad (which could be indicated by sensor alarms) then the food compartment 10 is preferably automatically unlocked and all owners of other compartments 10 in that unit, as well as unit administrators and operators, are preferably notified. Any of these individuals can remove the container 20 with the bad food item, empty the contents out, and then insert the container into the sanitation compartment. Once inserted, a cleaning program preferably starts automatically. When the cleaning program is finished, the compartment 10 is unlocked and the container 20 can be removed and reused.

In one embodiment, the cleaning compartment 10 may allow users to place an empty but dirty container upside down into the cleaning compartment. The cleaning compartment 20 may use pressurized heated water or a sanitizer mixer to blast out the contents and clean the container 20.

In one embodiment, the movement of containers to and from the cleaning compartment may be a manual process (i.e., a user places the dirty container in the machine and removes it when it is clean). In another embodiment, the container movement may be implemented through an automated, robotic process.

Food Preparation Compartments

A food preparation compartment 10 may suitably be:

a pizza oven;

a toaster;

a steamer;

a microwave; and/or any other current or future food preparation mechanism.

If the heating and cooling offered by the standard compartments is not enough, then containers can be moved to the above-listed special compartments for food preparation.

Beverage Dispensing Compartments

Beverage dispensing compartments dispense hot or cold beverages like sodas, water, coffee, milk, alcohol, etc. They can be used in a variety of environments, from workplaces (typically coffee, milk, hot & cold water) to bars (e.g., self-service beer dispenser with payment module).

Ice Making Compartment

An ice maker may be implemented as a special compartment 10.

Special Containers

Containers 20 may be provided independent from the unit 100 for personal use. This allows people to prepare and package lunch boxes ahead of time and keep them refrigerated at home until they go to work next morning. Once at work, the container 20 is put back into the unit with the proper programming. Special container bags may be provided to allow for the safe transport of containers 20 while maintaining temperature and other environmental conditions.

Prepared Food Containers

Businesses may offer prepared food items (e.g., breakfast, snacks, lunches, dinners, desserts, etc.) in standardized containers 20. Food providers may attach RFID chips (or similar technology) to containers 20 that store the food storage and preparation program for each individual package. When the container 20 is inserted into a unit 100, the processor 150 reads the RFID information and preferably automatically executes the correct food storage program (e.g., keep it at a certain temperature). Before users consume the items, they preferably activate the food preparation program and the unit automatically thaws, warms, heats, or otherwise prepares the food in their compartment as directed by the program.

Lists of Alerts

Possible user alerts include, but are not limited to:

compartment locked/unlocked;

container inserted/removed;

storage duration expired;

bad food detected;

cleaning process complete;

cooking, refrigerating and freezing complete;

begin process, end process;

tinier, proper temperature or pressure reached;

temperature too low/high;

humidity too low/high;

pressure too low/high;

other sensor readings low/high;
unauthorized access attempt;
power outage detected at restart;
error messages; and
refill compartment (e.g., in vending scenarios).

Methods of Heating Compartments

Methods of heating compartments 10 include, but are not limited to:

Hot air;
Electrical heating of surfaces;
Induction heating;
Microwave heating; and
Warming lamps.

Refrigeration of Compartments

Methods of refrigeration of compartments 10 include, but are not limited to:

Conventional Mechanical Refrigeration;
Vacuum cooling;
Thermoacoustic refrigeration;
Closed-Cycle Air Refrigeration; and
Cryogenic Refrigeration (e.g., for laboratory settings and other special environments).

ADDITIONAL EMBODIMENTS

Figure 8:
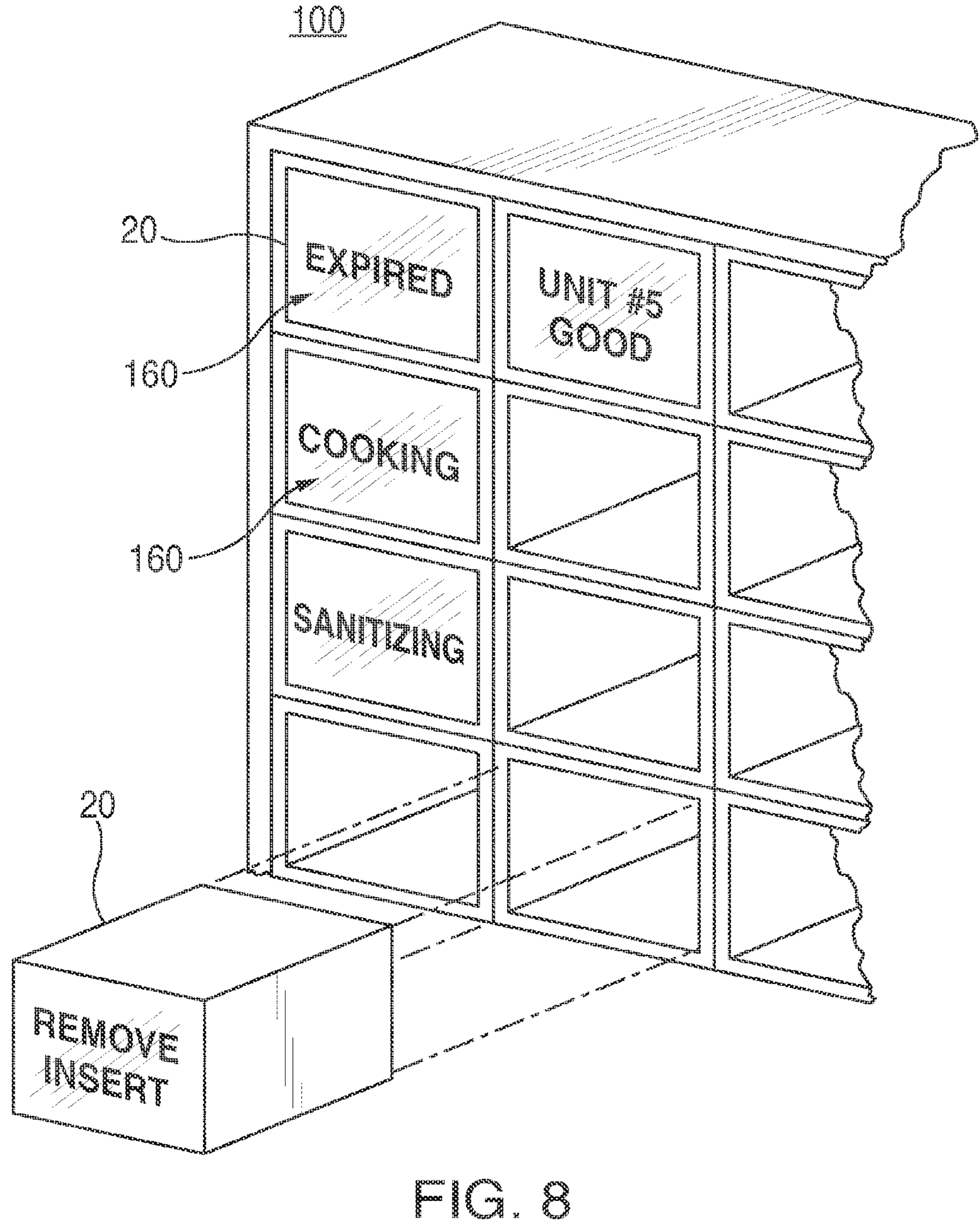
FIG. 8 is a schematic diagram illustrating a unit with containers having integrated displays or touchscreens, in accordance with one embodiment of the present invention.

FIG. 8 is a schematic diagram illustrating a unit 100 with containers 20 having integrated displays or touchscreens 160, in accordance with one embodiment of the present invention. The status of each container 20 is shown on the container's display.

Figure 9:
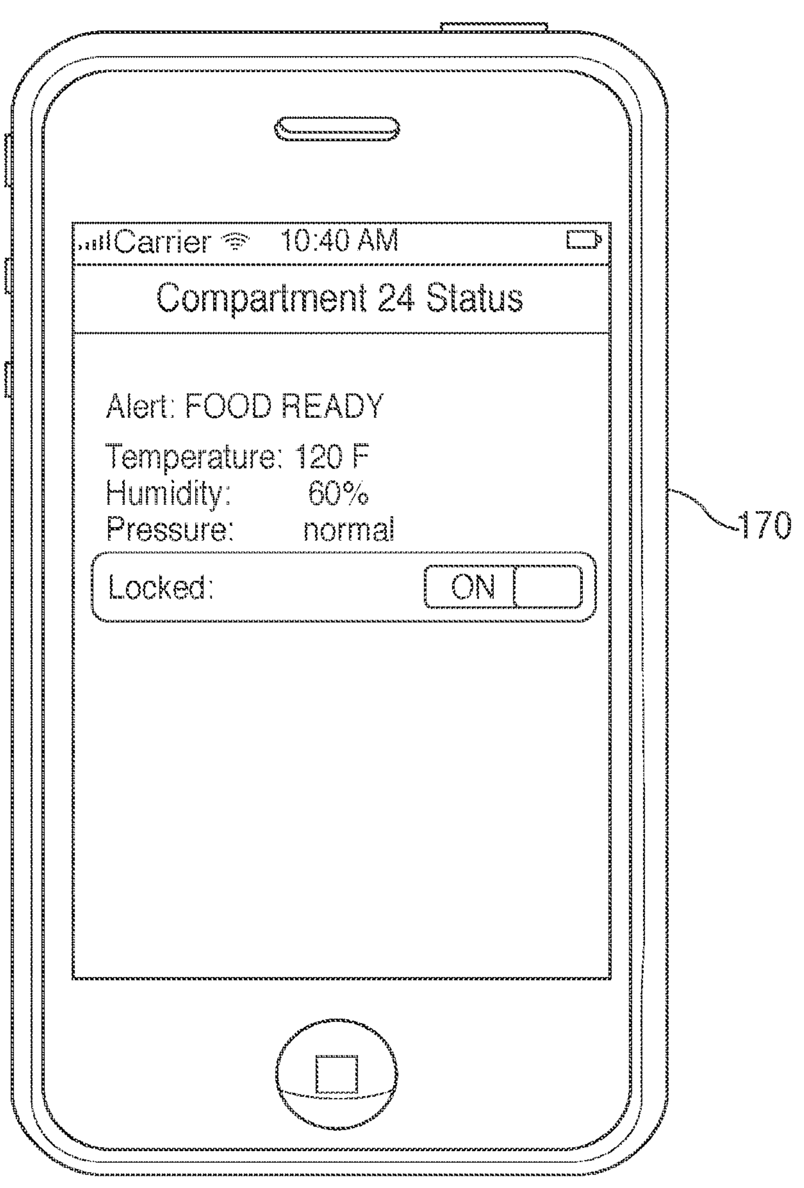
FIG. 9 illustrates a mobile device running an application that provides information regarding the status of a container and that can lock and unlock individual containers, in accordance with one embodiment of the present invention.

FIG. 9 illustrates a mobile device 170 ruining an application that provides information regarding the status of a container 20, in accordance with one embodiment of the present invention.

The unit 100 can be configured for offices, dormitories, laboratories, pharmacies, residential uses and other uses depending on user requirements. The present invention may be designed in any size with any combination of compartments and any shape to accommodate different requirements and users.

Figure 10:
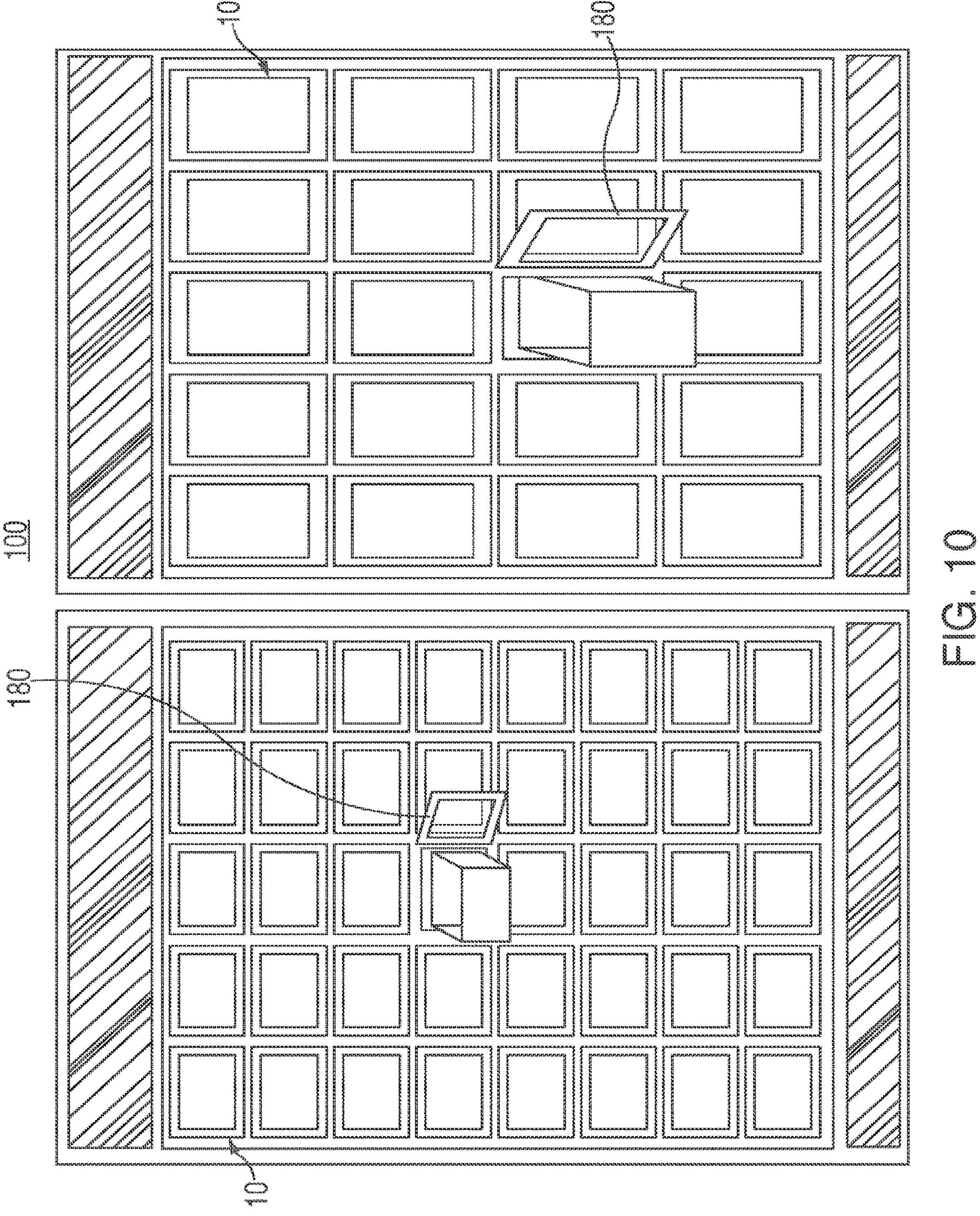
FIG. 10 is a schematic diagram illustrating a unit with small and large compartments, and with doors for each compartment, in accordance with one embodiment of the present invention.

FIG. 10 is a schematic diagram illustrating a unit 100 with 40 small and 20 large compartments 10, and with doors 180 for each compartment, in accordance with one embodiment of the present invention.

Figure 11:
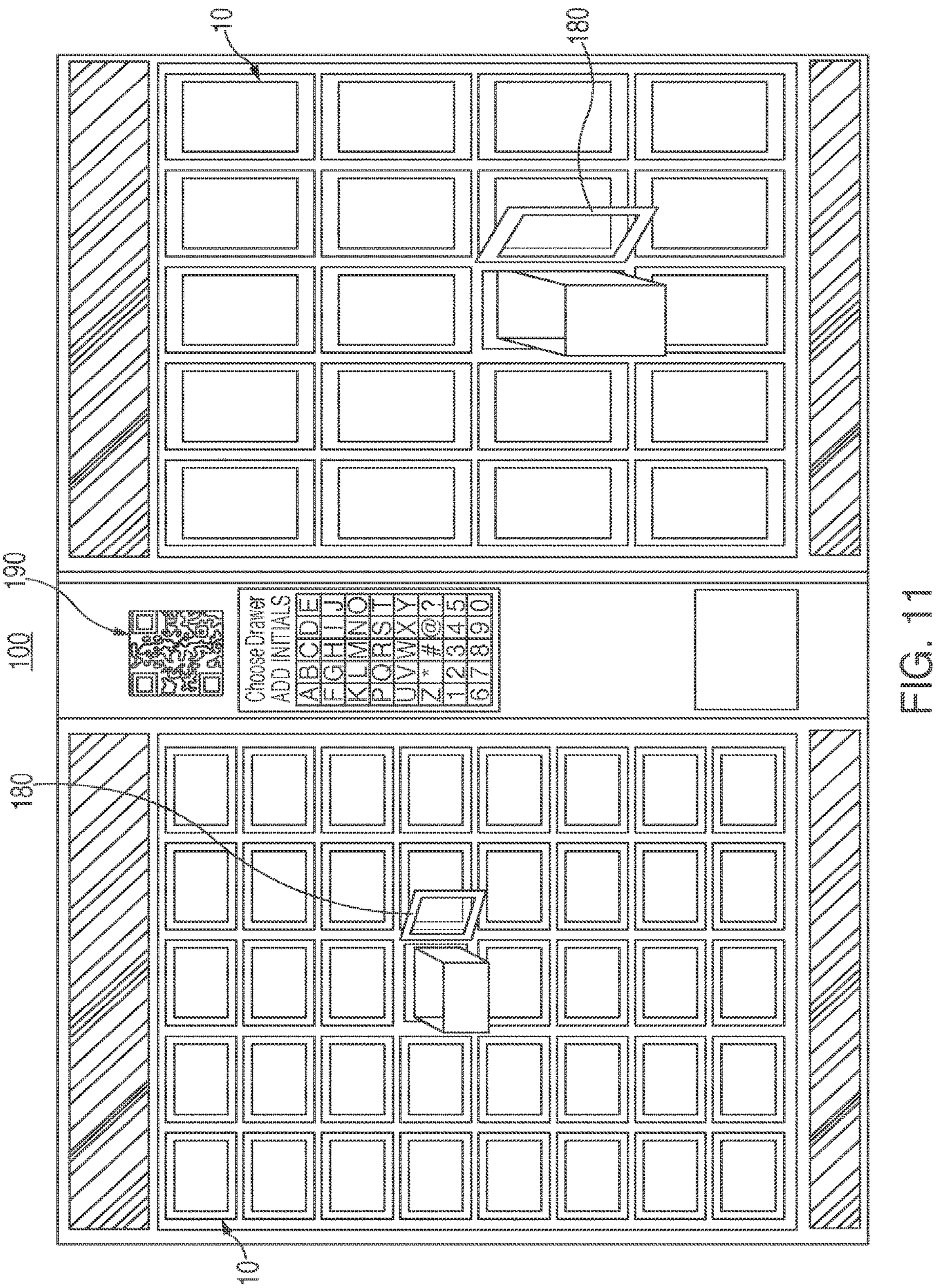
FIG. 11 is a schematic diagram illustrating a unit with small and large compartments, with doors for each compartment and with a mechanical or electronic input pad for access control, in accordance with one embodiment of the present invention.

FIG. 11 is a schematic diagram illustrating a unit 100 with 40 small and 20 large compartments 10, with doors 180 for each compartment and with a mechanical or electronic input pad 190 for access control (shown between the large and small compartments). This control can be located anywhere including, but not limited to, on the unit, in between one or more units or on a wall near the unit or units.

Figure 12:
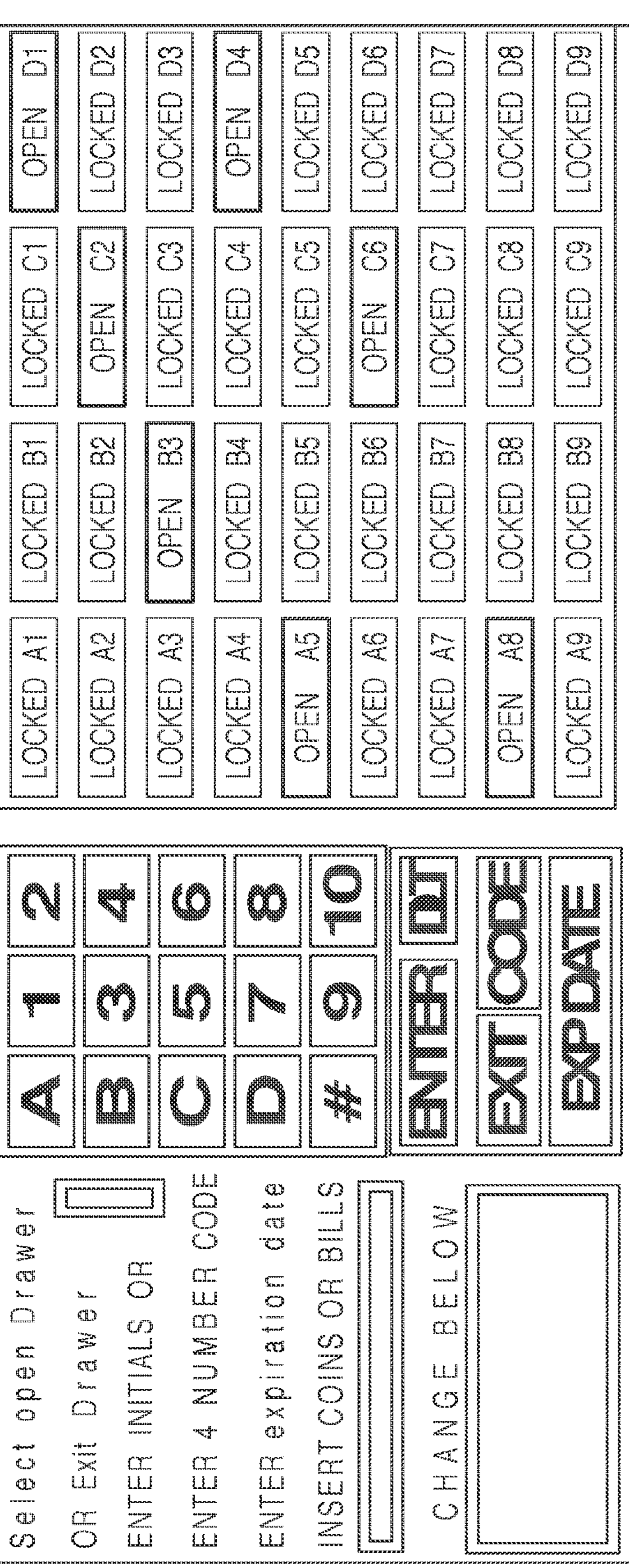
FIG. 12 is a schematic diagram of a bill changer and credit card reader that may be incorporated into a unit to allow the unit to function as a vending machine, in accordance with one embodiment of the present invention.

FIG. 12 is a schematic diagram of a bill changer and credit card reader 200 that may be incorporated into a unit 100 to allow the unit 100 to function as a vending machine. Like the unit 100 shown min FIG. 11, the bill changer and card reader 200 may be positioned on the unit or units, in between one or more units or on a wall near the unit or units. The letters and numbers in the bill changer and card reader have been exaggerated for ease of illustration.

The compartments 10 are preferably able to accept containers and/or inserts that come with a lid or bag for soups and/or liquids. The lid of the insert/container and the bag may optionally include a vacuum suction nipple which will allow for the contents to be vacuum packed, by either using the machines attachment or at home with a home use vacuum sealer hose. Lids may also come with a release valve (for pressurized items to be cooked)). These inserts/containers may be disposable or reusable based on the needs of the users.

The inserts/containers with lids may be sold separately or through the vending machine depending on the build of the unit 100. This allows for a cleaner and more sanitary refrigerator, as spills will be less likely as the food in held in an "insert" or "container" rather than in the compartment 10 directly. Each of these compartments 10 preferably has a separate door and allows for specific atmospheric conditions, whether it is a hot cooking area, cooling area or combination of the two. This provides for a more efficient method of heating and cooling or both at the same time.

A refrigeration unit 100 may also be incorporated with a microwave or convection oven unit with compartmentalized access as well. This may be a separate unit or an all-in-one unit depending on the size a buyer wishes to purchase. This unit 100 would allow multiple people to heat and cook food items at the same time. The present invention may also incorporate moving robotic abilities to move items from one compartment 10 to another. For example, a dirty box alerts the machine, and a robotic arm or belt could move the container to a dumping area and rinsing compartment to clean and sanitize the container 20.

Figure 13:
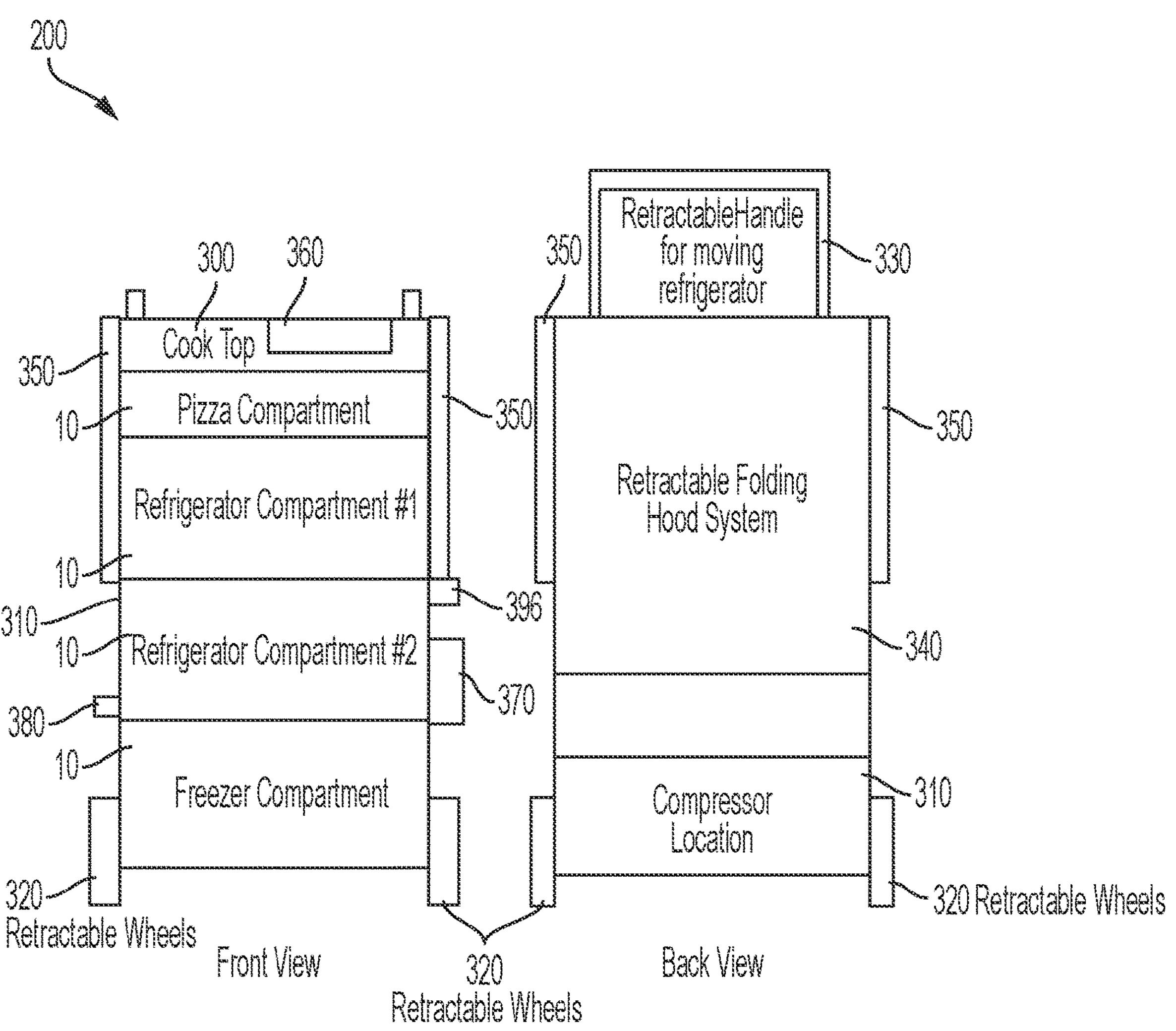
FIG. 13 is a schematic diagram showing front and rear views of a compact and integrated unit that incorporates an induction cook top 300, in accordance with one embodiment of the present invention.

FIG. 13 shows schematic front and rear views of a compact and integrated unit 200 that incorporates an induction cook top 300. The unit 200 includes a housing 310 that houses compartments 10 in a stacked arrangement. The induction cook top 300 is positioned on top of the stacked compartments 10, and utilizes an induction heating element, similar to the induction heating element shown and described above in connection with FIG. 7.

For purposes of illustration, four compartments labeled "pizza compartment," refrigerator compartment #1," refrigerator compartment #2" and "freezer compartment" are shown as part of unit 100. However, it should be appreciated that any type of compartment 10 discussed above and any number of compartments 10 can be used. The "pizza compartment" is preferably a refrigerator compartment that has been sized to accommodate a full size pizza.

The compressor 310 used to cool the refrigeration/freezer compartments 10 is preferably located at bottom rear of the unit 200. The unit 200 optionally includes retractable wheels 320 and a retractable handle 330 for transporting the unit 200. In addition, the unit 200 can optionally include a retractable folding hood system 340, and foldable surfaces 350 that can be folded up to provide work surfaces.

The induction cook top 300 preferably includes a photoelectric sensor 360 positioned below the top surface of the induction cook top 300. The photoelectric sensor 360 is used to detect the color of customized cookware that is designed to be used with the unit 200, as will be explained in more detail below. The unit 200 also includes a processor 370, whose functionality will be explained in more detail below.

Figure 14:
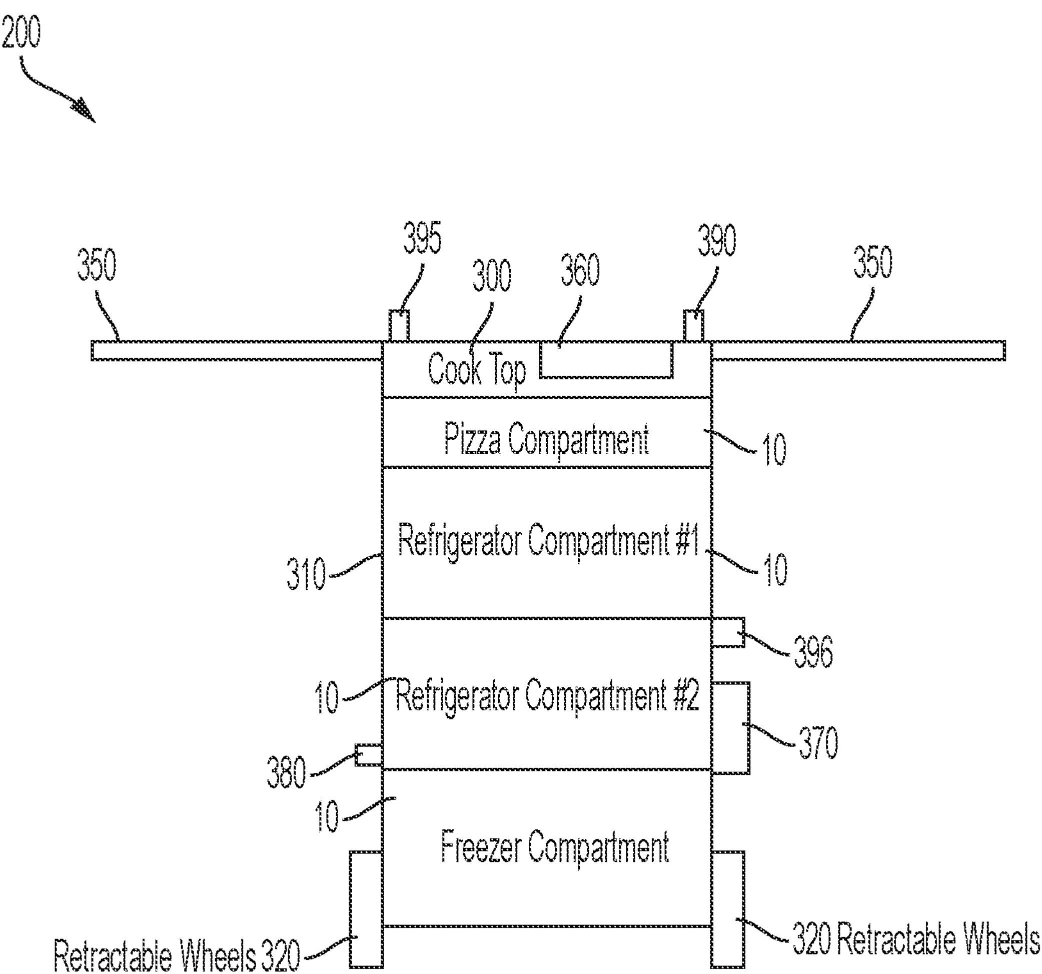
FIG. 14 is a schematic view of the front of the unit of FIG. 13 with the foldable surfaces in a deployed (folded up) configuration, in accordance with one embodiment of the present invention.

FIG. 14 is a schematic view of the front of unit 200 with the foldable surfaces 350 in a deployed (folded up) configuration. The foldable surfaces 350 provide a work station when in the deployed configuration.

Figure 15:
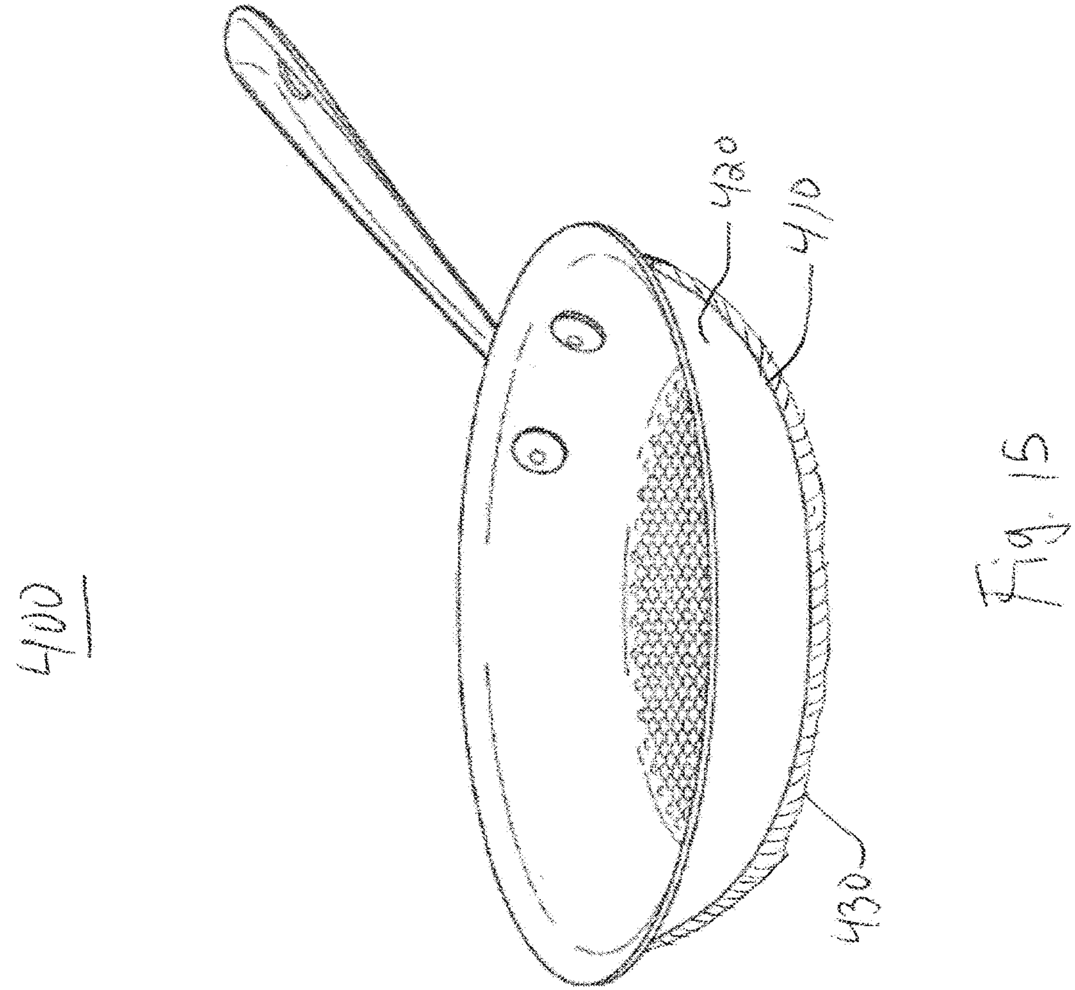
FIG. 15 is a schematic view of customized cookware that is adapted to be used with the unit of FIGS. 13 and 14, in accordance with one embodiment of the present invention.

FIG. 15 is a schematic view of customized cookware 400 that is adapted to be used with the unit 200 of FIGS. 13 and 14, in accordance with one embodiment of the present invention. The cookware 400 is preferably made with a material that exhibits high magnetic permeability so that it will work with the induction cook top 300. Examples of materials that can be used for the cookware 400 include, but are not limited to, metglas, iron, ferritic stainless steel, martensitic stainless steel or any other material suitable for use with an induction cook tip 300.

To improve heat conduction, the base 410 of the cookware 400 can be optionally made of a different material than the sides 420 of the cookware 400. For example, the base 410 can be made of iron and the sides 420 can be made of aluminum to allow heat to dissipate more uniformly across the cookware 400. Other combinations of materials with magnetic permeability and heat conduction properties can be used to allow for the design of cookware 400 tailored for specific cooking requirements.

The base 410 of the cookware 400 is preferably coated with an insulating layer 430 (e.g., a silicon layer) to act as a heat insulator and scratch protection. This will allow the cookware 400 to be placed on delicate surfaces without damaging those surfaces, even when the sides 420 and base 410 of the cookware is hot. The insulating layer 430 may be permanently affixed to the base 410 or it can be removably affixed to the base 410.

The insulating layer 430 is preferably between 0.5 mm and 2 mm thick, and is dyed such that it exhibits one of multiple predetermined colors. The color chosen for the insulating layer 430 will trigger a predetermined cooking program in the unit 200 when the cookware is placed on the induction cook top 300.

Although the shape of the cookware shown in FIG. 15 corresponds to a frying pan or saucepan, it should be appreciated that any shape or type of cookware be used (e.g., saute pans, saucepans, French skillets, stockpots, etc.) as long as it incorporates the features/specifications described above.

When the cookware 400 is placed on the cook top 300, the photoelectric sensor 360 detects its presence and also detects the color of the insulating layer 430 on the bottom of the cookware 400. In one preferred embodiment, a predetermined cooking program is initiated based on the color of the insulating layer 430 detected by the photoelectric sensor 360. As an illustrative example, a red insulating layer could trigger the following cooking program: (1) heat the cookware 400 to 350 degrees; (2) maintain that temperature for 10 minutes; (3) shut down the heating element; and (4) send a message to connected devices (e.g., smartphones) that cooking is finished. Other colors can trigger other cooking programs. For example, a yellow insulating layer could trigger a cooking program designed to warm up a pizza, while a blue insulating layer could trigger a cooking program designed to grill meat. The various cooking programs would be programmed into the processor 370 or stored in memory (not shown) that is accessed by processor 370.

The photoelectric sensor 360 could optionally be combined with other sensors (not shown) to trigger a reading from the photoelectric sensor 360. Examples of other sensors that could be incorporated into the cook top 300 include, but are not limited to: (1) pressure sensors that detect when a cookware 400 is placed on the cook top 300; and (2) magnetic sensors that are activated when magnetically permeable material is placed on the cook top 300.

The cook top 300 can optionally include LED lights (not shown) integrated into the cooking surface that indicates the status of the unit 200 via predetermine colors and visual effects. For example, the LED lights can be linked to the different cooking programs that are triggered by the different color insulating layers 430 on the cookware 400 (e.g., red LEDs are displayed when the "red" cooking program is activated, green LEDs are displayed when the "green" cooking program is activated, etc.).

The LED effects could also be linked to the status of a cooking program. As examples: (1) when a cooking program starts and the induction cook top 300 is heating up the cookware 400, the LEDs may display a "running" effect; (2) when the cookware 400 has reached the target temperature, all the LEDs may be constantly on; (3) when the cooking program has completed, all the LEDs may start blinking; and (4) when no cooking program is active, all LEDs are off. These are merely examples of how the LEDs can be used to display status. The effects used, number of LEDs turned on, colors displayed, etc., may be customized as desired for any given cooking program or other function of the unit 200.

The unit 200 may optionally include proximity sensors 380 and the processor 370 may be programmed to detect the presence of individuals in proximity to the unit 200 based on signals from the proximity sensor. The processor 370 may be programmed to shut down the cook top 300 if an individual is not detected by the proximity sensor 380.

An optional $CO_2$ sensor 390 and an optional smoke sensor 395 may be positioned on the cook top 300 or in proximity to the cook top 300 for detecting burning food. The processor 370 may be programmed to shut down the cook top 300 based on signals from the $CO_2$ sensor 390 and/or smoke sensor 395.

The processor 370 is in communication with the compartments 10, the compressor 320, the induction cooktop 300, the photoelectric sensor 360, the $CO_2$ sensor 390 (if used), the smoke sensor 395 (if used) and any other sensors and user interfaces incorporated into the unit 200. The processor 370 is programmed to execute all of the various control and monitoring functions of unit 200. It also integrates any wired or wireless communication devices used by operators to control and/or monitor the unit 200 via an application interface on the communication device. For illustrative purposes, the processor 370 is shown schematically attached to the side of the unit 200. However, the processor 370 can be attached anywhere on or within the unit 200.

The application interface is used by wired or wireless communication devices and communicates with the processor 370 and allows operators to interact with the unit 200. The application interface is preferable a wireless interface implemented on a mobile device.

The application interface allows operators to interact with the unit 200 to reconfigure cooking programs, change alarm and event thresholds, change the number and type of sensors used by the unit 200, manage authorized mobile devices and user authorizations, and enable special fin features of the unit 200, such as LED light shows. Multiple mobile devices may communicate simultaneously with the unit through the application interface app. In addition, all preconfigured cooking programs can be changed and new cooking programs can be added through the application interface.

The application interface is preferably configured to send events and alarms to all mobile devices that are configured to receive such events and alarms. Examples of events and alarms that can be sent include, but are not limited to: (1) cooking program has started; (2) cooking program has ended; (3) cooking program was terminated for some reason; and (4) please turn meat.

An optional interface module 396 on the unit 200 allows connection of a food/meat temperature probe (not shown). The cooking programs can be modified to consider input from the food/meat temperature probe. For example, the program may shut down the inductive cook top or reduce the heat and send a message when the food/meat probe indicates a predetermined temperature. In addition, other probes/sensors may be integrated through the interface module 396. Examples include, but are not limited to, humidity sensors or pressure sensors to measure humidity and/or pressure inside the cookware 400.

Any probes and/or sensors can be connected to the interface module 396 via wired connections or via wireless connections (e.g., Bluetooth or WiFi). Further, the processor 370 can be optionally programmed to reconfigure stored cooking programs on the fly based on input from any sensors being used, and thus the processor 370 would be able to control the preparation of meals automatically.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A system for storing and/or processing perishable or non-perishable items, comprising:
- a housing;
- at least two compartments contained within the housing, wherein each compartment is adapted to contain perishable or non-perishable items;
- a refrigeration unit associated with each compartment;
- an induction heating element positioned at the bottom of at least one compartment, wherein the heating element is configured for heating the compartment;
- a photoelectric sensor positioned below the induction heating element, wherein the photoelectric sensor is configured to detect the color of cookware placed on the induction heating element; and
- a processor contained within the housing in communication with the refrigeration unit and the induction heating element wherein the processor is adapted to individually control heating and refrigeration of each compartment, to initiate a predetermined cooking program based on the color of the cookware detected by the photoelectric sensor.

2. The system according to claim 1, further comprising removable containers positioned within the compartments, and wherein the compartments are lockable.

3. The system according to claim 1, comprising at least 8 compartments contained within the housing.

4. The system according to claim 3, comprising at least 20 compartments contained within the housing.

* * * * *